United States Patent [19]
Chen et al.

[11] Patent Number: 5,121,216
[45] Date of Patent: Jun. 9, 1992

[54] ADAPTIVE TRANSFORM CODING OF STILL IMAGES

[75] Inventors: Cheng-Tie Chen, Bridgewater Township, Somerset County; Didier J. LeGall, Springfield Township, Union County, both of N.J.

[73] Assignee: Bell Communications Research, Livingston, N.J.

[21] Appl. No.: 381,860

[22] Filed: Jul. 19, 1989

[51] Int. Cl.⁵ .............................. H04N 1/41
[52] U.S. Cl. .................. 358/261.3; 358/426; 358/432; 358/433; 382/56
[58] Field of Search .............. 358/261.3, 261.2, 426, 358/133, 138, 466, 432, 433, 261.1; 382/50, 56

[56] References Cited

U.S. PATENT DOCUMENTS

| | | | |
|---|---|---|---|
| 4,581,638 | 4/1986 | Chiariglione et al. | 358/433 |
| 4,698,689 | 10/1987 | Tzou | 358/433 |
| 4,710,822 | 12/1987 | Matsunawa | 358/466 |
| 4,754,492 | 6/1988 | Malvar | 358/433 |
| 4,774,574 | 9/1988 | Daly et al. | 358/133 |
| 4,805,030 | 2/1989 | Tanaka | 358/433 |
| 4,853,778 | 8/1989 | Tanaka | 358/426 |
| 4,922,273 | 5/1990 | Yonekawa et al. | 382/56 |
| 4,979,038 | 12/1990 | Guichard et al. | 358/133 |

OTHER PUBLICATIONS

"Scene Adaptive Coder," W. H. Chen et al., IEEE Trans. Commun., vol. COM-32, pp. 225-232, Mar. 1984.
"Improvements of Transform Coding Algorithm for Motion-Compensated Interframe Prediction Errors-DCT/SQ Coding," M. Kaneko et al., IEEE J. Selected Areas in Commun., vol. SAC-5, pp. 1068-1078, Aug. 1987.

*Primary Examiner*—Edward L. Coles, Sr.
*Assistant Examiner*—Thomas D. Lee
*Attorney, Agent, or Firm*—Leonard Charles Suchyta

[57] ABSTRACT

In accordance with our adaptive transform coding algorithm for a still image, the image is divided into small blocks of pixels and each block of pixels is transformed using an orthogonal transform such as a discrete cosine transform. The resulting transform coefficients are compressed and coded to form a bit stream for transmission to a remote receiver. The compression parameters for each block of pixels are chosen based on a busyness measure for the block such as the magnitude of the $(K+1)^{th}$ most significant transform coefficient. This enables busy blocks for which the human visual system is not sensitive to degradation to be transmitted at low bit rates while enabling other blocks for which the human visual system is sensitive to degradation to be transmitted at higher bit rates. Thus, the algorithm is able to achieve a tradeoff between image quality and bit rate.

6 Claims, 2 Drawing Sheets

ADAPTIVE TRANSFORM CODING OF STILL IMAGES

FIELD OF THE INVENTION

The present invention relates to a method for coding still images, and more particularly, to a method for coding still images involving the use of a discrete cosine transform in combination with adaptive thresholding and adaptive quantization to achieve low bit rates as well as high image quality.

BACKGROUND OF THE INVENTION

Transform coding has proven to be an efficient means of coding a still image signal for transmission to a remote receiver. In accordance with a basic transform image coding algorithm, a still image is divided into small blocks of pixels. For example, each block of pixels may be an 8×8 or 16×16 block. Each block of pixels undergoes a two dimensional orthogonal transform to produce a two dimensional array of transform coefficients. For still image coding applications, the discrete cosine transform has emerged as the best orthogonal transform from the point of view of image compression and ease of implementation.

After a block of pixels undergoes a transform such as a discrete cosine transform, the resulting transform coefficients are subject to compression by thresholding and quantization. Thresholding involves setting all coefficients whose magnitude is smaller than a threshold value T equal to zero. In some thresholding processes, when a coefficient has a magnitude greater than T, T is subtracted if the coefficient is positive and T is added if the coefficient is negative. The DC transform coefficient may be excluded from the thresholding process. Quantization involves scaling a coefficient by a step size Q and rounding off to the nearest integer.

After compression, the compressed transform coefficients are then coded, for example, using a Huffman code, to form a bit stream for transmission to a remote receiver. The bit rate of the bit stream and the image quality of the block when received at a remote receiver depend on the compression parameters T and Q.

At the receiver, an inverse process occurs to reconstruct the original block of pixels. Thus, the received bit stream is decoded and the received quantized transform coefficients are expanded by the quantization step size. This may be viewed as an inverse quantization step. An inverse transform such as an inverse discrete cosine transform is then applied to the transform coefficients to reconstruct the block of pixels. In this manner an image is transmitted block by block from a transmitter to a receiver. Typically, there is no inverse thresholding step in the reconstruction process.

The conventional transform coding algorithm described above, treats every block of pixels equally without regard to the image content, i.e., each block is processed with the same compression parameters Q and T. The drawback of this is that the best tradeoff between bit rate and image quality cannot be achieved amongst a wide variety of images or amongst different blocks from the same image. A better tradeoff between bit rate and image quality can be achieved if blocks of pixels from a particular image with different attributes are processed differently (see e.g., "Scene Adaptive Codes", W. H. Chen et al, *IEEE Transactions on Communications*, VOL. COM.-32 No. 3, March 1984, pp. 225-231; M. Kaneko et al, "Improvements of Transform Coding Algorithms for Motion Compensated Interframe Prediction Errors-DCT/SQ Coding", *IEEE J. Selected Areas in Communications*, Vol. SAC-5, August 1987, pp. 1068-1078).

The human visual system can tolerate the degradation of some blocks of pixels, but cannot tolerate the degradation of other blocks of pixels. We have found that efficient use of transmission resources is realized when the blocks for which degradation can be tolerated are transmitted with a lower bit rate and the blocks for which degradation cannot be tolerated are transmitted with a higher bit rate to preserve information content.

It is therefore an object of the present invention to provide a transform coding algorithm for a still image in which each block of pixels is processed differently based on certain attributes of the block to achieve a better tradeoff between image quality and bit rate. In particular, it is an object of the present invention to provide a transform coding algorithm in which different blocks of pixels from an image are processed using different compression parameters, and thus transmitted with different bit rates, depending on how much degradation of the block can be tolerated by the human visual system when the block is received.

SUMMARY OF THE INVENTION

The present invention is a method for coding still images. As in the conventional transform coding algorithm described above, an image is divided into blocks of pixels and each block of pixels undergoes a two dimensional orthogonal transform such as a discrete cosine transform. However, unlike the conventional transform algorithm discussed above, in accordance with the present invention, the transform coefficients are compressed using compression parameters, i.e. a threshold value T and a quantization step size Q, chosen individually for each block of pixels.

In general, smaller (larger) compression parameters result in higher (lower) bit rates and image quality. It is desirable to use large compression parameters for busy blocks where the human visual system is not very sensitive to degradation and small compression parameters for smooth blocks where the human visual system is sensitive to degradation.

Illustratively, a measure of the busyness of a block is the magnitude of the $(K+1)^{th}$ most significant transform coefficient, where K is an integer value which remains the same for all blocks in an image or in a plurality of images. The magnitude of the $(K+1)^{th}$ most significant coefficient is used to form the threshold value T and to determine the quantization step size Q. The magnitude of the $(K+1)^{th}$ transform coefficient is large for busy blocks where the human visual system is not sensitive to degradation and results in large compression parameters and lower bit rates. On the other hand, for smooth blocks, the transform coefficients fall off rapidly and the magnitude of the $(K+1)^{th}$ transform coefficient is small resulting in small compression parameters and higher bit rates.

After compression using the selected compression parameters, the transform coefficients for each block are coded to form a bit stream for transmission to a remote receiver or for storage in a memory. Some overhead bits are transmitted with the bit stream formed from the transform coefficients for each block to inform the receiver of the selected quantization step size.

The adaptive transform coding algorithm of the present invention enables a better tradeoff bit rate and image quality than is possible using conventional transform coding algorithms for still images.

DETAILED DESCRIPTION OF THE INVENTION

Figure 1:
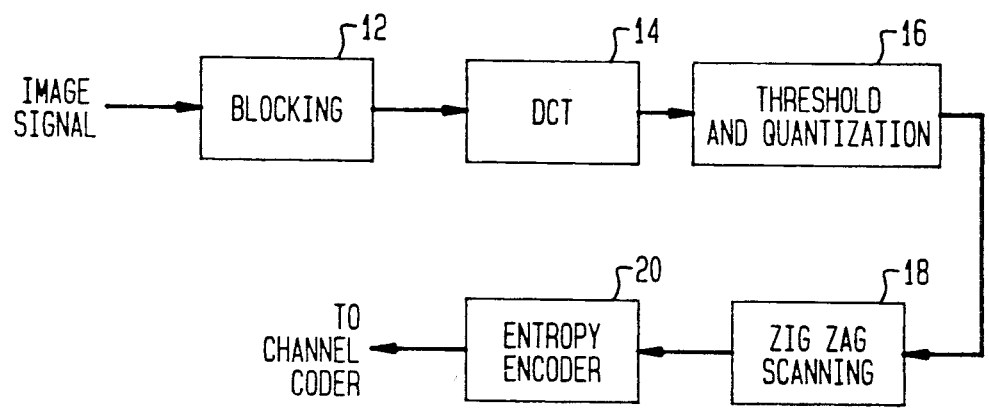
FIG. 1 schematically illustrates a conventional transform coding algorithm for a still image.

A conventional transform coding algorithm for a still image is schematically illustrated by the block diagram of FIG. 1.

A still image signal to be coded comprises a two dimensional array of pixels, e.g., 256×256 pixels. The still image signal is divided (step 12 of FIG. 1) into disjoint blocks of smaller size, e.g., 8×8 or 16×16 blocks of pixels.

A two dimensional discrete cosine transform is applied to each block of pixels (step 14 of FIG. 1).

The two dimensional discrete cosine transform of a two dimensional pixel value array $f(j,k)$ for $j,k=0,1 \ldots N-1$ can be defined as $$F(u,v) = \frac{4c(u)c(v)}{N^2} \sum_{j=0}^{N-1} \sum_{k=0}^{N-1} f(j,k) \cos\left[\frac{(2j-1)u\pi}{2N}\right] \cos\left[\frac{(2k-1)v\pi}{2N}\right] \quad (1)$$

for $u,v = 0, 1, \ldots N-1$, where $$c(w) = \begin{cases} \frac{1}{\sqrt{2}} & \text{for } w = 0 \\ 1 & \text{for } w = 1, 2 \ldots N-1 \end{cases} \quad (2)$$

Thus, $F(u,v)$ for $u,v=0,1,\ldots N-1$ represents a two dimensional array of transform coefficients.

The inverse transform is then given by $$F(j,k) = \quad (3)$$

$$\sum_{j=0}^{N-1} \sum_{v=0}^{N-1} c(u)c(v)f(u,v)\cos\left[\frac{(2j+1)u\pi}{2N}\right]\cos\left[\frac{(2k+1)v\pi}{2N}\right]$$

The coefficients $F(u,v)$ obtained for a block of pixels may be viewed as comprising DC and AC coefficients. The DC coefficient is $F(0,0)$ which represents the average intensity of the block. The remainder of the coefficients ($F(0,1)$, $F(1,0)$ etc.) are AC coefficients.

Illustratively, the transform coefficients $F(u,v)$ obtained by applying the discrete cosine transform to each block of pixels in the input image are normalized to a range of $[-255,255]$ for the AC coefficients and $[0,510]$ for the DC coefficient if the input image data range from $[0,255]$, i.e., 8 bits per pixel.

The two dimensional array of the transform coefficients $F(u,v)$ obtained for each block of pixels is then compressed by thresholding and quantization (step 16 of FIG. 1).

In particular each of the coefficients except the DC coefficient $F(0,0)$ is thresholded and each of the coefficients is quantized.

The characteristics of the thresholding step are as follows:

$$F_T(u,v) = \begin{cases} 0 & \text{if } |F(u,v)| < T \\ F(u,v), & \text{otherwise} \end{cases} \quad (4)$$

where $F_T(u,v)$ represents the thresholded coefficients and T is a predetermined threshold value. This means that if the magnitude of a coefficient is less than T it is set to zero. In some thresholding processes, when the magnitude of a coefficient is greater than T, T is subtracted from a positive coefficient and added to a negative coefficient.

The characteristics of the quantizing step are as follows $$F_{TQ}(u,v) = NINT(F_T(u,v)/Q) \quad (5)$$

where $F_{TQ}(u,v)$ is a thresholded and quantized transform coefficient, Q is a quantization step size and NINT is the nearest integer function. Thus, a quantized and threshold transform coefficient $F_{TQ}(u,v)$ is obtained from a threshold coefficient $F_T(u,v)$ by scaling with a step size Q and rounding to the nearest integer. The DC coefficient $F(0,0)$ (which is not thresholded) is quantized with Q=1 to ensure intensity continuity within the image.

After compression, the two dimensional array of transform coefficients $F_{TQ}(u,v)$ $u=0,1,\ldots N-1$, $v=0,1,\ldots N-1$ is zig-zag scanned (step 18 of FIG. 1) (see the Chen et al reference identified above) into a one dimensional sequence of transform coefficients to facilitate encoding. The one dimensional sequence of transform coefficients is then coded (step 20 of FIG. 1) using an entropy encoding process to form a bit stream which may be transmitted to a channel coder for transmission to a remote receiver or stored in a memory.

With the above algorithm, the bit rate and image quality are controlled by the threshold value T and quantization step size Q which are referred to herein as the compression parameters. As indicated above, smaller compression parameters result in higher bit rates and higher image quality, while larger compression parameters result in lower bit rates and lower image quality. The conventional transform coding algorithm described above uses the same compression parameters for all blocks in an image.

The disadvantage of using the same compression parameters for all blocks is that an optimal tradeoff between bit rate and image quality is hard to achieve. Larger compression parameters result in lower bit rates, but the quality is inconsistent among the various blocks within an image. On the other hand, higher image quality requires smaller compression parameters but at the price of a higher bit rate for blocks wherein significant degradation is tolerated by the human visual system so that adequate quality could be achievable with lower bit rates.

Thus, in accordance with the present invention an adaptive transform coding algorithm is utilized wherein different blocks within an image are processed with different compression parameters so that blocks for which degradation is tolerated are transmitted at lower bit rates, while blocks for which degradation is not tolerated are transmitted at higher bit rates to preserve information content.

The sensitivity of the human visual system to degradation in a particular pixel block varies with respect to the activity content or busyness of the block. The human visual system is not especially sensitive to degradation in busy blocks but is more sensitive to degradation of smooth (i.e. not busy) blocks. Thus, the adaptive transform coding algorithm of the present invention uses large compression parameters and low bit rates for busy blocks where the human visual system is not sensitive to degradation and uses small compression parameters and high bit rates for smooth blocks where even a small amount of degradation is visible.

When the inventive adaptive transform coding algorithm is used, image quality is more consistent since the compression parameters are adapted to the image content. The bit rate range for various images is narrower because busy blocks, which usually occupy more bits when a conventional transform algorithm is used, are forced by the adaptive transform algorithm into large compression. Therefore the adaptive transform coding algorithm achieves a better tradeoff between bit rate and image quality.

Figure 2:
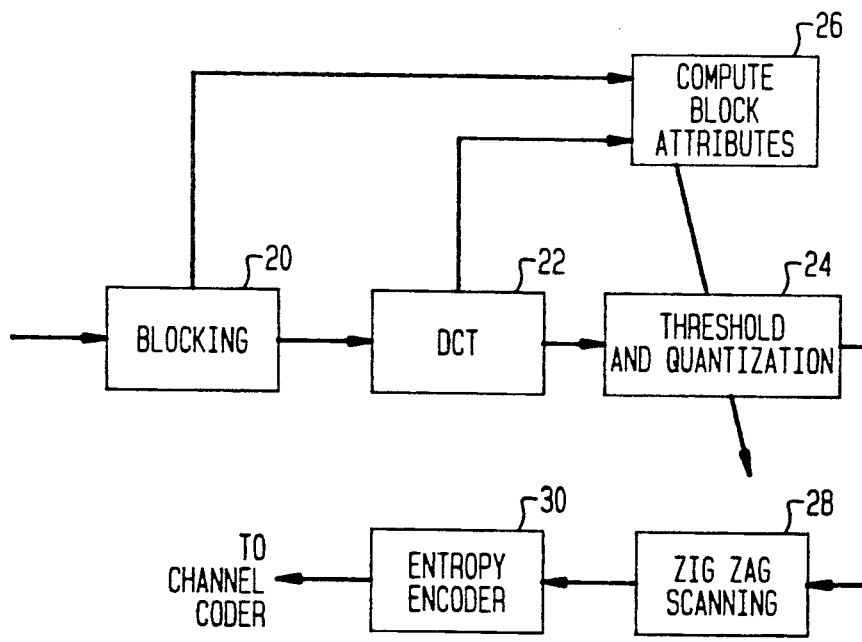
FIG. 2 schematically illustrates an adaptive transform coding algorithm for a still image in accordance with an illustrative embodiment of the present invention.

An adaptive transform coding algorithm for a still image is schematically illustrated by the block diagram of FIG. 2.

Illustratively, a still image signal is divided into small blocks of pixels (step 20 of FIG. 2). As in the case of the conventional algorithm, a two dimensional orthogonal transform such as the discrete cosine transform is applied to each block of pixels to form a two dimensional array of transform coefficients F(u,v) (step 22 of FIG. 2). The transform coefficients F(u,v) for each block are then compressed (step 24, FIG. 2). However, unlike the conventional algorithm of FIG. 1, wherein the compression parameters T,Q are the same for all blocks, the compression parameters T,Q for the algorithm of FIG. 2 are chosen based on a busyness measure or activity content of a block. Thus, a busyness measure is obtained for each block (step 26, FIG. 2) using block attributes or transform coefficient attributes and compression parameters are chosen accordingly to compress the transform coefficients.

For each block, the two dimensional array of transform coefficients is then zig-zag scanned to form a one dimensional sequence of transform coefficients (step 28, FIG. 2). The one dimensional sequence of transform coefficients is then entropy encoded (step 30, FIG. 2) and transmitted to a channel coder for transmission to a remote receiver or stored in memory.

At a receiver, an inverse process occurs to reconstruct the block of pixels from the coded transform coefficients. Thus, for reconstructing a block of pixels, the received bit stream is decoded and the transform coefficients are expanded by the chosen quantization step size Q. Accordingly, the transmitted bit stream for each block of pixels should include some overhead bits indicating the selected quantization step size. An inverse orthogonal transform such as an inverse DCT transform is then applied to the transform coefficients to reconstruct the block of pixels.

Illustratively, the reconstruction process contains no inverse thresholding type of step. In the coding process, the thresholding step serves a filtering function. Accordingly, in some embodiments of the invention, the thresholding step may be replaced by another type of filtering step.

A busyness measure for a block is now considered in detail. In particular, the attributes examined in step 26, FIG. 2, to determine the compression parameters for each block are now considered. One possible busyness measure is the block variance or energy in the AC transform coefficients. However, the AC energy does not provide an adequate indicator in all cases as to the degree of degradation that can be tolerated by the human visual system for a block of pixels.

An alternative busyness measure may be obtained as follows. For each block of pixels, the transform coefficients are ranked according to magnitude so that $F^N(u,v)$ indicates the $N^{th}$ most significant transform coefficient for a block of pixels. In this case the business measure for a block is the magnitude of the $(K+1)^{th}$ most significant transform coefficient, $|F^K-1(u,v)|$; where K is a predetermined integer value which remains the same for all blocks in an image.

The transform coefficients for a block of pixels are then compressed (thresholded and quantized) as follows:

A. Keep only the K most significant transform coefficients, all others are truncated to zero. This is equivalent to an adaptive thresholding process where the threshold value T is equal to the absolute value of the $(K+1)^{th}$ most significant transform coefficient.

B. Choose a quantization step size Q, out of a plurality of available quantization step sizes, which is closest to but smaller than twice the magnitude of the $(K+1)^{th}$ most significant transform coefficient, i.e. $2|F^{K-1}(u,v)|$; if such a choice is not possible, the smallest available quantization step size is chosen.

In the adaptive transform coding algorithm described above, the image quality is determined by the value of K; higher K results in higher quality. Illustratively, for 16×16 pixel blocks K may be chosen at about 100 and for 8×8 pixel blocks K may be chosen at about 25 to form a reconstructed image substantially identical to the original. Similarly, for a 16×16 pixel block size, sixteen quantizers may be made available with step sizes 1.00, 1.25, 1.50, 1.75, 2.00, 2.25, 2.50, 2.75, 3.00, 3.25, 3.50, 3.75, 4.00, 4.25, 4.50, 5.00. When sixteen quantizers are utilized, four bits of overhead per block are transmitted to the receiver to inform the receiver of the selected quantizer. Thus, in general the overhead required by the adaptive coding technique of the present invention is trivial.

Figure 3:
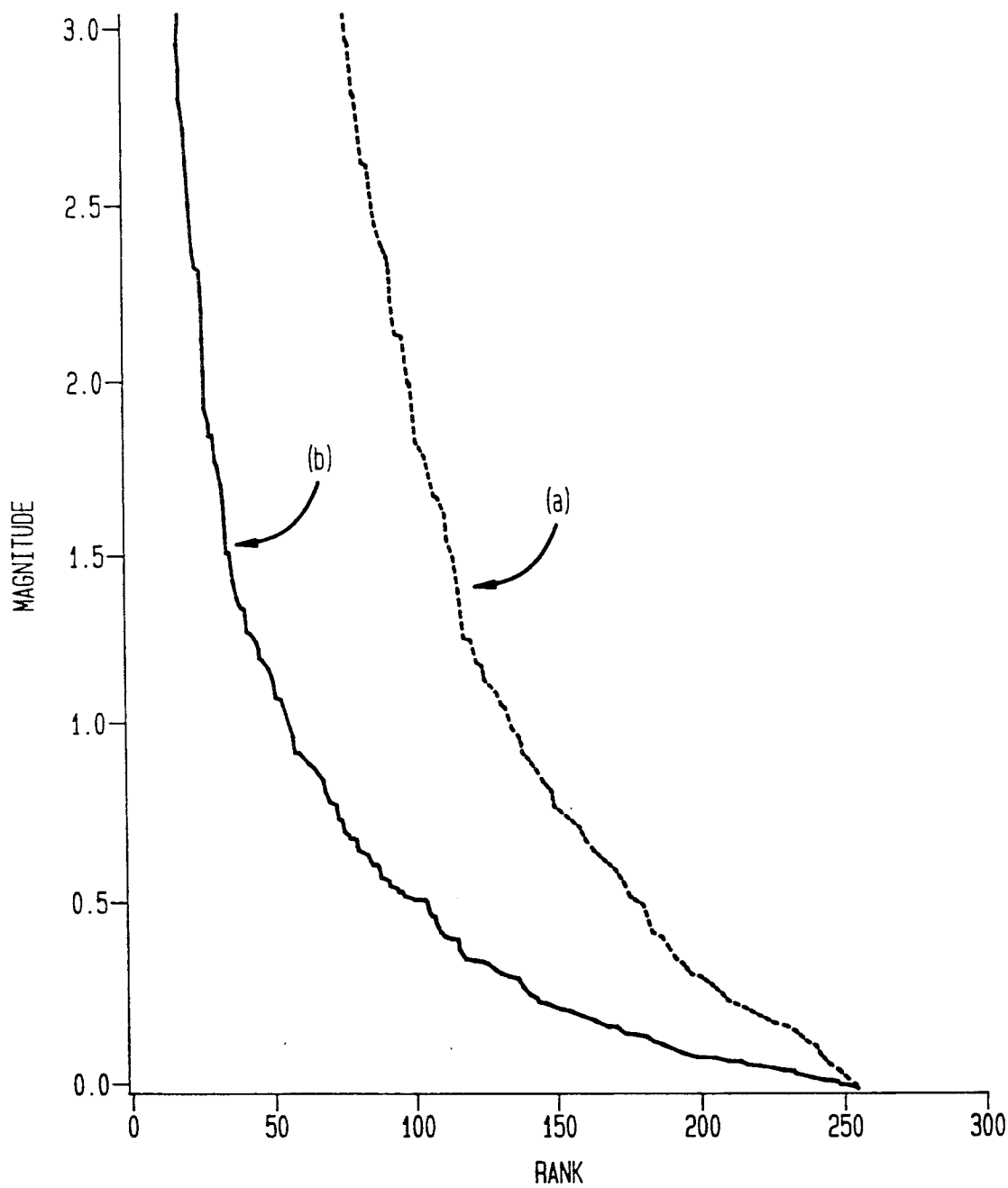
FIG. 3 illustrates ranked DCT coefficients for a busy block of pixels and for a smooth block of pixels from an image.

FIG. 3 plots the ranked transform coefficients for a busy block (curve a) and the ranked transform coefficients for a smooth block (curve b). In FIG. 3, the abscissa is the rank N of the coefficient $F^N(u,v)$ and the ordinate is the magnitude. As can be seen in FIG. 3, the magnitude of the coefficients falls off much more rapidly for a smooth block than for a busy block. Thus, the magnitude of the $(K+1)^{th}$ transform coefficient is a good business measure for a block. Since the magnitude of the $(K+1)^{th}$ coefficient is relatively large for a busy block, large compression parameters and low bit rates will result when the adaptive transform algorithm of the present invention is utilized. Similarly, since the magnitude of the $(K+1)^{th}$ transform coefficient is relatively small for a smooth block, small compression parameters and high bit rates will result.

For a given degree of image quality, the adaptive transform algorithm of the present invention permits a significant savings in the number of bits necessary to transmit an image in comparison to the conventional non-adaptive transform coding algorithm.

Finally, the above described embodiments of the invention are intended to be illustrative only. Numerous alternative embodiments may be devised by those skilled in the art without departing from the spirit and scope of the following claims.

What is claimed is:

1. A method for transforming a block of pixels from an electronic image into a digital representation of said image comprising the steps of
    orthogonally transforming said block of pixels into an signal representing transform coefficients,
    selecting a fixed threshold value T and a fixed quantization step size Q for compressing said signal representing transform coefficients based on a busyness measure for said block into an abridged signal representing compressed transform coefficients, and
    coding said abridged signal representing compressed transform coefficients into a digital signal resulting from said compressing step,
    wherein said busyness measure is a magnitude of the $(K+1)$th most significant one of said transform coefficients where K is a predetermined integer,
    wherein the threshold value T is equal to the magnitude of the $(K+1)$th most significant one of said transform coefficients, and
    wherein the quantization step size Q is selected to be smaller than twice the magnitude of the $(K+1)$th most significant one of said transform coefficients.

2. The method of claim 1 wherein if a quantization step size smaller than twice the magnitude of the $(K+1)^{th}$ most significant one of said transform coefficients is not available, then the smallest available quantization step size is selected.

3. The method of claim 1 wherein said step of orthogonally transforming said block of pixels comprises applying a discrete cosine transform to said block of pixels.

4. A method for transforming an electronic still image into a digital representation of said image comprising the steps of
    dividing the image into blocks of pixels,
    applying an orthogonal transform to each block of pixels to create a signal representing transform coefficients,
    selecting a threshold value T and a quantization step size Q for each block of pixels based on the $(K+1)$th most significant one of said transform coefficients for each block, where T and Q are constant for each individual block but vary from block to block and where K is a predetermined integer value which remains the same for all blocks in said image,
    compressing said signal representing transform coefficients for each block by thresholding with the selected threshold value T and quantizing using the selected quantization step size Q into an abridged signal representing compressed transform coefficients, and
    coding said abridged signal representing compressed transform coefficients of each block into a digital signal.

5. The method of claim 4 wherein said thresholding step for each block comprises retaining for each block only the K most significant ones of said transform coefficients and truncating to zero all other transform coefficients.

6. A method as recited in claim 4 wherein said orthogonally transforming step is effected by applying a discrete cosine transform algorithm.

* * * * *